(12) United States Patent
Schenk et al.

(10) Patent No.: US 6,220,790 B1
(45) Date of Patent: Apr. 24, 2001

(54) PROCESS FOR CONVEYING FINE-GRAINED SOLID

(75) Inventors: Johannes Schenk, Linz; Michael Nagl, Reichenau; Walter-Rainer Kastner, Zwettl, all of (AT)

(73) Assignee: Voest Alpine Industrieanlagenbau, Linz (AT)

( * ) Notice: Subject to any disclaimer, the term of this patent is extended or adjusted under 35 U.S.C. 154(b) by 0 days.

(21) Appl. No.: 09/051,698

(22) PCT Filed: Oct. 15, 1996

(86) PCT No.: PCT/AT96/00196

§ 371 Date: Apr. 17, 1998

§ 102(e) Date: Apr. 17, 1998

(87) PCT Pub. No.: WO97/14817

PCT Pub. Date: Apr. 24, 1997

(30) Foreign Application Priority Data

Oct. 19, 1995 (AT) ................................................ A 1745/95

(51) Int. Cl.[7] .................................................. B65G 51/40
(52) U.S. Cl. .............................. 406/3; 406/155; 406/183; 141/236
(58) Field of Search ............................. 406/3, 106, 155, 406/156, 181, 183; 451/75, 64, 38; 141/236, 243

(56) References Cited

U.S. PATENT DOCUMENTS

| | | | |
|---|---|---|---|
| 3,646,595 | * | 2/1972 | Williams .................................. 55/284 |
| 3,854,778 | * | 12/1974 | Trythall ................................... 302/27 |
| 3,972,567 | * | 8/1976 | Uhl ......................................... 302/61 |
| 4,191,500 | * | 3/1980 | Oberg et al. ........................... 406/146 |
| 4,234,271 | * | 11/1980 | Kalina ..................................... 406/1 |
| 4,359,298 | * | 11/1982 | Webb et al. ............................. 406/3 |
| 4,695,205 | * | 9/1987 | Levine .................................. 406/38 |
| 4,702,288 | * | 10/1987 | Ulveling et al. ....................... 141/67 |
| 4,793,742 | * | 12/1988 | Strand ................................... 406/79 |
| 4,996,796 | * | 3/1991 | Rhoades ................................. 51/26 |
| 5,114,078 | * | 5/1992 | Takata .................................. 406/88 |
| 5,140,516 | * | 8/1992 | Rainville .............................. 364/140 |
| 5,322,074 | * | 6/1994 | Cross, Jr. ............................ 131/110 |
| 5,350,299 | * | 9/1994 | Gallant ................................. 433/88 |
| 5,365,699 | * | 11/1994 | Armstrong et al. ..................... 451/7 |
| 5,431,593 | * | 7/1995 | Puschner .............................. 451/75 |
| 5,645,381 | * | 7/1997 | Guidetti et al. ...................... 406/156 |
| 5,746,596 | * | 5/1998 | Gallant et al. ........................ 433/88 |

FOREIGN PATENT DOCUMENTS

4438135A1 * 2/1996 (DE) .................................... 141/286

* cited by examiner

*Primary Examiner*—Joseph E. Valenza
*Assistant Examiner*—Joe Dillon, Jr.

(57) ABSTRACT

A process for continuous conveying of a fine-grained and/or pulverized solid to two or more target points by a conveying medium, e.g. gas. The solid is charged into a distribution vessel and from there to several target points by respective supply lines each at a desired target flow rate intended for target point. The target flow rate for each target point is divided into at least two partial target flow rates from the distribution vessel via separate partial supply lines. The partial target flow rates are reunited at the respective target points at the latest. To adjust the target flow rate at a target point at a specific level, individual partial supply lines leading to this target point are alternatively kept shut-off or open.

13 Claims, 1 Drawing Sheet

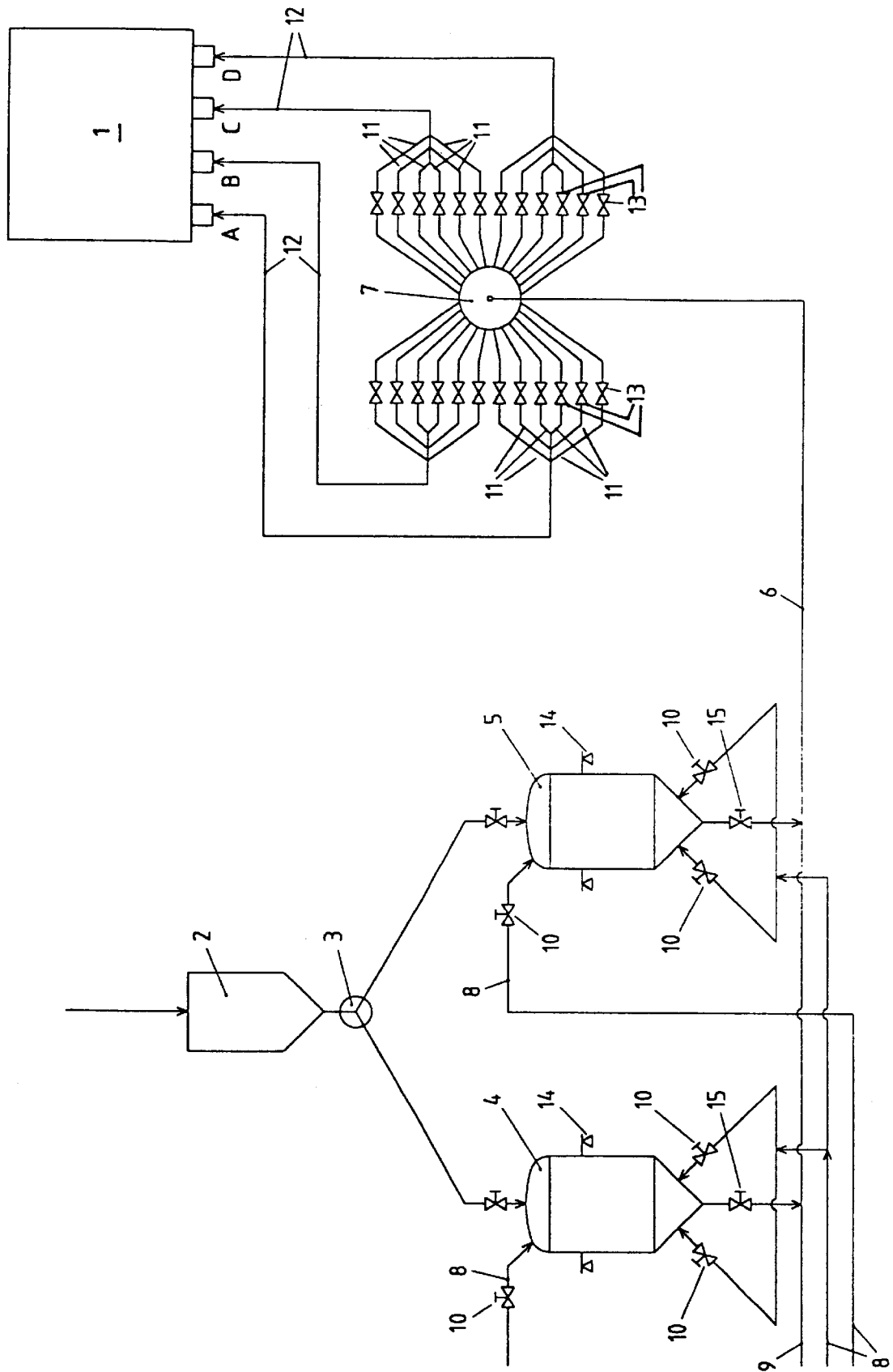

PROCESS FOR CONVEYING FINE-GRAINED SOLID

BACKGROUND OF THE INVENTION

This invention relates to a process for continuously conveying fine-grained or pulverized solid to two or several target points by means of a conveying medium. The solid is charged into a distribution vessel and, from there, the solid is conveyed to a selected one of a plurality of target points by means of the conveying medium moving the solid via one supply line each in the desired target flow rate. The invention also relates to apparatus for performance of the process.

The process of conveying fine-grained to pulverized solids by compressed air from a distribution vessel to several target points, and especially conveying of coal 10 dust to several consumers, such as tuyeres of a blast furnace, is known (DE-A 26 46 130, DE-C -30 50 394 and DE-A -25 37 370). In this process, especially close-grained flow conveying is applied. Coal dust is first pneumatically fed into a distribution vessel at the flow rate in which the coal dust is further delivered from this vessel. From the distribution vessel, several supply lines lead to the several target points, i.e., the tuyeres of the blast furnace. Each tuyere is charged with a material flow conveyed via a separate supply line.

It has turned out that the coal dust in the distribution vessel that acts as a static distributor is distributed to the individual supply lines with a relatively high accuracy (±15% of the desired target flow rate). For instance, the target flow rate conveyed to the target points can be easily adjusted by adjusting the difference between the pressure at the target point and the pressure inside the distribution vessel.

Serious problems will occur if the target flow rate of the solid has to be adjusted or controlled individually for the target points commonly supplied by one distribution vessel. That requires installing control fittings, such as dampers, valves, etc., which allow flow rate adjustment, and mass flow meters in each supply line. However, insurmountable difficulties have been encountered in practice because such control fittings and mass flow meters are subject to extremely high wear from conveying fine-grained or pulverized solids. The failure of one control fitting will cause irregularities at the other target points. The replacement of a control fitting is expensive as conveying has to be interrupted.

SUMMARY OF THE INVENTION

The object of the invention is to avoid these disadvantages and problems and to provide a process for conveying a fine-grained solid of the aforementioned type, where the target points which are commonly fed from one distribution vessel can also be charged with individually adjustable target quantities/unit of time of fine-grained or pulverized solids in a simple way. The process should be low cost, and the facility serving this purpose should be little susceptible to failure and have a long service life.

The invention solves the problem by dividing the target flow rate intended for one target point into two or several partial target flow rates. Each separate partial supply line from the distribution vessel conveys solid by action of the conveying medium, and the flow is divided into several partial flows at the partial flow rate. The partial target flows are reunited at the latest at the respective target point. In order to adjust the target flow rate at a target point to a specific level, the various partial supply lines leading to this target point are alternatively either shut-off or open preferably by respective valves.

The target flow rate intended for a target point can thus be easily selected by summation of the partial target flow rates that are conveyed to this target point by means of the partial supply lines, by keeping one or several of the partial supply lines leading to this target point open or shut off, depending on the desired target flow rate intended for this target point. This is easy to implement because only valves with on/off function are required in the partial supply lines, as these are practically not subject to higher wear than other equipment parts required for executing the process. Special control valves and flow meters may be omitted.

It is expedient to select the same volume for all partial target flow rates intended for one target point, thus ensuring a particularly uniform and trouble free distribution of the partial target flow rates in the distribution vessel.

To graduate the target flow rate intended for a target point not only into equally large volume steps, different volumes as compared to other partial target flow rates are selected for one or several partial target flow rate(s) intended for a target point according to a preferred design.

The process according to the invention can be accomplished particularly advantageously if pressure gas is used as the conveying medium. However, it can also be accomplished if a liquid is used as the conveying medium.

If the target flow rate is to be changed at one target point and the target flow rates are to be kept strictly constant at this target point or the other target points, the flow rate charged into the distribution vessel is preferably changed when the target flow rate intended for the one target point is changed.

Apparatus for implementing this process features a combination of the following features: a distribution vessel into which a supply line for the fine-grained solid to be conveyed and for a conveying medium leads; two or more target points to which fine-grained solids is to be conveyed; at least two partial supply lines leading out of the distribution vessel to each target point; and a shut-off valve each in each partial supply line, which can be set to off or on position.

In a simple and low cost design, the shut-off valves are installed near the distribution vessel and each partial supply line leading to one target point runs into a supply main leading to this target point in the flow direction downstream of the shut-off valves.

The partial supply lines leading to each of the target points advantageously have equally dimensioned cross sections.

A preferred design, which allows for finer graduation of the target flow rates intended for a target point, uses differently dimensioned cross sections of the partial supply lines leading to a target point.

BRIEF DESCRIPTION OF THE DRAWINGS

The invention is explained in detail in the following by means of an embodiment schematically represented in the drawing.

DESCRIPTION OF A PREFERRED EMBODIMENT

A metallurgical plant 1, for example a melting vessel such as a blast furnace, etc., is supplied with fine-grained solids, for example pulverized coal, pulverized additives, iron ore, sponge iron, etc., where the fine-grained solids are to be fed into the metallurgical plant 1 at four target points A, B, C, D.

Fine-grained solids from a storage bin 2 are first alternately directed into filling two bins 4, 5 by a mechanical, solids conveying device 3, such as a rotary valve. While one bin is being filled, the other is pressurized with a conveying medium such as fluidization gas. This conveys solids from the latter bin via a conveying line 6 to a distribution vessel 7, which acts as static distributor. The conveying medium is conveyed to bins 4, 5 via lines 8 and is also fed into conveying line 6 downstream of the bins 4, 5 via line 9 which communicates into line 6 from upstream of the bins 4, 5. Control fittings 10, which are designed as valves, not only allow alternate charging of bins 4, 5 but also adjusting of the flow rates of the conveying medium conveyed via lines 8. Control fittings 10 adjust the flow rate of the conveying medium fed into the top of the bins 4 and 5 via lines 8 and also adjust the flow rate of the conveying medium fed into bins 4 and 5 at the bottom for the purpose of solids fluidization.

According to the invention, the target flow rate intended for each target point A to D is first subdivided into partial target flow rates, and each partial target flow rate is discharged from distribution vessel 7 via a respective separate partial supply line 11. In the represented embodiment, there are six partial supply lines 11 intended for each target point A to D. The partial supply lines 11 leading to each target point A to D run into a respective supply main 12 leading to the respective target point A to D. Each of the partial supply lines 11 is provided with a shut-off valve 13, which only has to be capable of being set to on or off position.

The total flow rate of solids fed to metallurgical plant 1 is adjusted by a control fitting provided with valves 15 at the outlet of each bin 4, 5 and by weighing the bin by means of weighing devices 14. Instead of a control fitting with valves 15, other devices can be provided, such as a rotary valve. During change-over from one bin 4 to the other bin 5, the flow rate of solids fed to distribution vessel 7 remains practically constant.

To reduce a target flow rate intended for a target point A to D, one or two or several partial supply lines 11 intended for this target point A to D are shut off by actuating the respective shut-off valve 13. To increase the target flow rate at a selected target point A to D, individual partial supply lines 11 to the other target points A to D can be shut off, which results in a change in distribution of the total flow rate of the solid fed to distribution vessel 7.

When a constant total flow rate of fine-grained solids is fed to distribution vessel 7, the target flow rates that are fed to the target points A to D supplied by distribution vessel 7 increase if the target flow rate fed to one target point A to D is reduced. The flow rate by which the target flow rate has been reduced is distributed among the remaining target points. To prevent such an increase at the remaining target points, the total flow rate/unit of time fed to distribution vessel 7 is reduced accordingly.

On the other hand, to increase the target flow rate to a target point, the total flow rate fed to the distribution vessel 7 is increased, wherein the target flow rates to the other target points remain completely constant. As this would increase the flow rate at all target points, the material flow at the other target points has to be reduced by switching off one or several of the partial supply lines 11, which lead to the other target points.

According to the invention, the target flow rate is not continuously adjusted, but by appropriate connection and disconnection, through opening and closing of shut-off valves 13, of individual partial supply lines 11, the control problem can be adequately solved for a number of technical applications. The higher is the number of partial supply lines 11 intended for a target point A to D, i.e., the finer is the subdivision of the target flow rate into partial target flow rates and the more precise is the adjustment of the target flow rate time to a target point.

The invention has the essential advantages that only shut-off valves 13 with an on-off function are required in partial supply lines 11, which are considerably less subject to wear than control valves providing for dosing.

Shut-off valves 13 are preferably used, as they allow a free flow through the full cross section of the pipe upon opening and do not produce any material deflection as would occur in the case, e.g. of a ball valve or a slide gate, in order to protect shut-off valves 13 against wear.

Moreover, owing to the high distribution accuracy of distribution vessel 7, mass flow metering of target partial flow rates can be dispensed with at a number of conveying functions.

The invention can be used for conveying a variety of fine-grained solids or bulk materials, not only in the metallurgical sector but also in completely different technological fields, such as in the cement industry, at thermal power stations, mills, sugar factories, etc.

In the field of power station engineering, the invention can be used, e.g. for conveying coal dust or slurries (e.g. mechanically de-watered sludge or coal sludge) to the burners of a vessel and for charging additives (e.g. limestone or dolomite) into the flue gas for binding sulfurous substances (e.g. sulfur).

In the field of coal gasification, the invention can be used for conveying and distributing coal dust to the coal gasifier with several feeding points.

In the cement industry, the invention can be advantageously used, e.g. for conveying and distributing limestone dust to the precalcining zone.

What is claimed is:

1. A process for continuously conveying a fine grained or a pulverized solid material to at least two target points comprising:
   supplying the fine grained or pulverized solid material to a distribution vessel through a conveying medium acting on the material, and supplying conveying medium for conveying the material to the distribution vessel and then from the distribution vessel to the target points, wherein the conveying medium conveys material at a desired target flow rate for each target point;
   for each of the at least two target points, dividing the flow of conveying medium and material from the distribution vessel into at least two partial target flows;
   then recombining the partial target flows for each of the target points before the partial target flows reach the respective target points, and
   selectively adjusting the target flow rate at each of the target points by selectively shutting off or fully opening each of the partial target flows to each of the target points.

2. The process of claim 1, wherein the target flow rates to each of the target points is the same and the partial target flows are selectively opened or shut off so that the target flow rates to the target points are the same.

3. The process of claim 1, wherein the target flow rates to each of the target points are not all the same, and the partial target flows arc selectively opened or shut off for adjusting the target flow rates to each of the target points to a desired level.

4. The process of claim 1, further comprising shutting off at least one of the partial target flows to at least one of the target points for adjusting the relative target flow rates to the target points.

5. The process of claim 1, wherein pressure gas is the conveying medium.

6. The process of claim 1, further comprising additionally adjusting the flow rate of conveying medium and material into the distribution vessel.

7. The method of claim 6, further comprising further coordinating the flow rate of conveying medium and solid material into the distribution vessel through the opening and shutting off of partial target flows to each of the target points in order to maintain a selected target flow rate of material to each of the target points.

8. Apparatus for conveying fine grained or pulverized solid material by a conveying medium to at least first and second target points, comprising:

a supply of the solid material to be conveyed;

a conduit for supplying conveying medium and for receiving the material to be conveyed from the supply and for conveying the received material along with the conveying medium;

a distribution vessel connected with the conduit for receiving the conveying medium and the conveyed material;

at least a first and second partial supply line respectively communicating between the distribution vessel and each of the first and second target points, whereby the flow of conveying medium and material to each of the target points may pass through all of the respective partial supply lines and be recombined prior to each of the first and second target points;

a respective valve at each of the partial supply lines, each valve being settable between a fully open and a fully shut position for respectively permitting and prohibiting flow of conveying medium and material through the partial supply line to the respective target point thereby permitting adjustment of a flow rate of conveying medium and material to each of the target points.

9. The apparatus of claim 8, wherein the partial supply lines leading to at least one of the supply lines have equally dimensioned cross sections.

10. The apparatus of claim 8, wherein the partial supply lines leading to at least one of the supply lines have respectively differently dimensioned cross sections.

11. The apparatus of claim 8, wherein the supply comprises a first and a second bin for receiving the solid material to be conveyed;

the conduit extending between the bins and the distribution vessel;

a shut-off connection between each of the bins and the conduit and operative for selectively delivering or halting delivery of solid material to the conduit from each of the bins so that the conveying medium can convey the material to the distribution vessel.

12. The apparatus of claim 8, further comprising a respective supply line leading into each of the first and second target points;

the respective partial supply lines being near the distribution vessel and each partial supply line leading into the respective supply line to the respective target point.

13. The apparatus of claim 12, wherein the valves arc located relatively nearer to the distribution vessel and further from the target points.

* * * * *